United States Patent
Zhang et al.

(10) Patent No.: US 11,540,226 B2
(45) Date of Patent: Dec. 27, 2022

(54) METHOD AND DEVICE FOR DETERMINING POWER CONTROL OFFSET FOR PUCCH

(71) Applicant: China Academy of Telecommunications Technology, Beijing (CN)

(72) Inventors: Di Zhang, Beijing (CN); Fang-Chen Cheng, Beijing (CN); Xiangli Lin, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 108 days.

(21) Appl. No.: 16/977,086

(22) PCT Filed: Dec. 5, 2018

(86) PCT No.: PCT/CN2018/119419
§ 371 (c)(1),
(2) Date: Aug. 31, 2020

(87) PCT Pub. No.: WO2019/184431
PCT Pub. Date: Oct. 3, 2019

(65) Prior Publication Data
US 2021/0007056 A1    Jan. 7, 2021

(30) Foreign Application Priority Data

Mar. 30, 2018    (CN) .......................... 201810296910.7

(51) Int. Cl.
*H04W 52/14*    (2009.01)
*H04B 1/713*    (2011.01)
(Continued)

(52) U.S. Cl.
CPC .......... *H04W 52/146* (2013.01); *H04B 1/713* (2013.01); *H04L 5/0051* (2013.01); *H04L 5/10* (2013.01); *H04W 72/0413* (2013.01)

(58) Field of Classification Search
CPC ........... H04W 52/146; H04W 72/0413; H04W 52/325; H04W 52/362; H04W 52/06;
(Continued)

(56) References Cited

U.S. PATENT DOCUMENTS

| | | | | |
|---|---|---|---|---|
| 2018/0310298 A1* | 10/2018 | Li | .......................... | H04L 1/0031 |
| 2019/0230603 A1* | 7/2019 | Liu | ..................... | H04W 52/325 |
| 2020/0163024 A1* | 5/2020 | Li | ....................... | H04L 27/2605 |

FOREIGN PATENT DOCUMENTS

| | | |
|---|---|---|
| CN | 101466138 A | 6/2009 |
| CN | 102348269 A | 2/2012 |

OTHER PUBLICATIONS

CATT, R1-1721453, "Remaining Aspects of NR Power Control", 3GPP RAN WG1 Meeting #91, dated Dec. 1, 2017. Section 2.2. (Year: 2017).*

(Continued)

*Primary Examiner* — Huy D Vu
*Assistant Examiner* — Robert Ma
(74) *Attorney, Agent, or Firm* — Kilpatrick Townsend & Stockton, LLP (57) ABSTRACT

Embodiments of the present application provide a method and a device for determining a power control offset for a PUCCH, for resolving the issue in which existing methods for determining a power control offset for a PUCCH are incompatible with new radio communications systems. The method comprises: determining the number of bits, $O_{UCI}$, of first uplink control information (UCI) required to be transmitted on a PUCCH, and determining the number, $N_{RE}$, of resource elements (RE) carrying the first UCI in the
(Continued)

Determining a quantity $O_{UCI}$ of bits of the first UCI required to be transmitted on a PUCCH, and determining a quantity $N_{RE}$ of REs bearing the first UCI in the PUCCH    101

Determining an offset $\Delta_{PUCCH\_TF,c}(i)$ for PUCCH power control calculation according to a formula $\Delta_{PUCCH\_TF,c}(i) = 10\log_{10}\left(2^{g(O_{UCI}/N_{RE})} - 1\right)$, $g(O_{UCI}/N_{RE})$ is a function with $O_{UCI}$ and $N_{RE}$ being variables    102

PUCCH; and determining, according to formula (I), an offset $\Delta_{PUCCH\_TF,c}(i)$ for calculation of power control of the PUCCH, and $g(O_{UCI}/N_{RE})$ is a function having $O_{UCI}$ and $N_{RE}$ as variables thereof.

7 Claims, 4 Drawing Sheets

(51) Int. Cl.
   *H04L 5/00* (2006.01)
   *H04L 5/10* (2006.01)
   *H04W 72/04* (2009.01)
(58) Field of Classification Search
   CPC ...... H04W 52/18; H04W 52/36; H04B 1/713; H04L 5/0051; H04L 5/10; H04L 5/0053; H04L 5/0091; H04L 1/0031; H04L 27/2605
   See application file for complete search history.

(56) References Cited

OTHER PUBLICATIONS

CATT, R1-1801746, "Correction on NR PUCCH Power Control Formula", 3GPP TSG WG1 Meeting #92, dated Mar. 2, 2018. Section 2.1, 2.2. (Year: 2018).*

CATT, "Remaining Aspects of NR Power Control", 3GPP TSG RAN WG1 Meeting #91 Reno, NV, U.S.A., Nov. 27-Dec. 1, 2017, total 16 pages, R1-1721453 (revision of R1-1720215).

CATT, "Remaining Issues of Non-CA Based Power Control", 3GPP TSG RAN WG1 Meeting #92bis, Sanya, China, Apr. 15-20, 2018, total 16 pages, R1-1803763.

CATT, "Correction on NR PUCCH Power Control Formula", 3GPP TSG RAN WG1 Meeting #92, Athens, Greece, Feb. 26-Mar. 2, 2018, total 18 pages, R1-1801746.

ZTE et al., "Offline summary for AI 7.1.6.1 NR UL power control in non-CA aspects", 3GPP TSG RAN WG1 Meeting #92, Athens, Greece, Feb. 26-Mar. 2, 2018, total 10 pages, R1-1803356.

* cited by examiner

METHOD AND DEVICE FOR DETERMINING POWER CONTROL OFFSET FOR PUCCH

The present application is a national phase entry under 35 U.S.C. § 371 of International Application No. PCT/CN2018/119419, filed on Dec. 5, 2018, which claims the priority from Chinese Patent Application No. 201810296910.7, filed with the China National Intellectual Property Administration (CNIPA) on Mar. 30, 2018 and entitled "Method and Device for Determining Power Control Offset for PUCCH", which is hereby incorporated by reference in its entirety.

FIELD

The present application relates to the field of communication technologies, and particularly to a method and device for determining a Physical Uplink Control Channel (PUCCH) power control offset.

BACKGROUND

With the development and change of the mobile communication service demand, the International Telecommunication Union (ITU), the 3rd Generation Partnership Project (3GPP) and other organizations all begin to research a new wireless communication system, e.g., 5 Generation New RAT (5G NR).

In the discussion process of the NR, it is assumed that the power control is performed on the PUCCH in the slot i on the carrier c by the following formula (1):

$$P_{PUCCH,c}(i) = \min\left\{\begin{array}{l} P_{CMAX,c}(i), \\ P_{0\_PUCCH,c}(b) + PL_c(k) + \Delta_{F\_PUCCH,c}(F) + \\ \Delta_{PUCCH\_TF,c}(i) + g_c(i, l) \end{array}\right\} [dBm] \quad (1)$$

wherein $P_{0\_PUCCH,c}(b)$ is the PUCCH target power configured by the high layer on the carrier c and is obtained by the cell-specific part in combination with the User Equipment (UE)-specific part;

$PL_c(k)$ is the path loss compensation parameter, and k is the sequence number of the pilot resource used in the path loss measurement configured by the Radio Resource Control (RRC);

$\Delta_{F\_PUCCH,c}$ (F) is the power offset values of different PUCCH formats configured by the high layer, and F is the index of a PUCCH formant;

$g_c(i,l)$ is the close-loop power adjustment parameter;

$\Delta_{PUCCH\_TF,c}(i)$ is an offset for reflecting the system coding performance.

In the 5G network construction, the PUCCH uses a new Polar coding scheme, of which the performance is improved significantly compared to the Tail Biting CC (TBCC) coding scheme of the Long Term Evolution (LTE) system. In the same scenario, if the same transmission performance is to be achieved, the Polar coding scheme requires the less power, reducing the power consumption of the terminal. Moreover, compared to the LTE, the NR supports new PUCCH formats, such as PUCCH format 0, PUCCH format 1, PUCCH format 2, PUCCH format 3, and PUCCH format 4.

Since the PUCCH format, bit range, coding scheme, etc. used in the NR are different from those in the existing wireless communication system, the existing method for determining the power control offset $\Delta_{PUCCH\_TF,c}(i)$ for the PUCCH cannot adapt to the new power control method and coding scheme adopted in the NR.

BRIEF SUMMARY

Embodiments of the present application provide a method and device for determining a PUCCH power control offset, to provide a new solution for determining the PUCCH power control offset, to solve the problem that the existing method for determining the PUCCH power control offset cannot adapt to the new wireless communication system.

In a first aspect, a method for determining a PUCCH power control offset is provided, including:

determining a quantity $O_{UCI}$ of bits of first Uplink Control Information (UCI) required to be transmitted on a PUCCH, and determining a quantity Ni of Resource Elements (REs) bearing the first UCI in the PUCCH; and determining the offset $\Delta_{PUCCH\_TF,c}(i)$ for PUCCH power control calculation according to a formula $\Delta_{PUCCH\_TF,c}(i) = 10 \log_{10}(2^{g(O_{UCI}/N_{RE})} - 1)$, wherein $g(O_{UCI}/N_{RE})$ is a function with $O_{UCI}$ and Ni being variables.

In a possible implementation, the determining the quantity $N_{RE}$ of REs bearing the UCI in the PUCCH, includes:

determining $N_{RE}$ as $\frac{2}{3} * N_{symb}^{PUCCH} * M_{SC}^{PUCCH}$ when a PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determining $N_{RE}$ as $(N_{symb}^{PUCCH} - N_{DMRS-symb}^{PUCCH}) * M_{SC}^{PUCCH}$ when a PUCCH format 3/4 is used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a Demodulation Reference Signal (DMRS) defined in the PUCCH format 3/4, and $M_{SC}^{PUCCH}$ is a PUCCH bandwidth occupied by UCI defined in the PUCCH format 3/4.

In a possible implementation, $g(O_{UCI}/N_{RE})$ is a linear fitting function with $O_{UCI}$ and $N_{RE}$ being variables.

In a possible implementation, $g(O_{UCI}/N_{RE})$ is $a*(O_{UCI}/Ni)+b$, wherein a and b are tuning coefficients, $1.5 \leq a \leq 2.5$, and $-1 \leq b \leq 1$.

In a possible implementation, a and b include a plurality of preset values respectively, and the determining the offset $\Delta_{PUCCH\_TF,c}(i)$ for PUCCH power control calculation according to the formula $\Delta_{PUCCH\_TF,c}(i) = 10 \log_{10}(2^{g(O_{UCI}/N_{RE})} - 1)$, includes:

determining values of a and b corresponding to a PUCCH format used for transmitting the first UCI, the $O_{UCI}$ of the first UCI, and a frequency hopping situation.

In a second aspect, a terminal is provided, which includes:

a memory configured to store instructions;

a processor configured to read the instructions in the memory to:

determine a quantity $O_{UCI}$ of bits of first UCI required to be transmitted on a PUCCH, and determine a quantity $N_{RE}$ of REs bearing the first UCI in the PUCCH; and determine an offset $\Delta_{PUCCH\_TF,c}(i)$ for PUCCH power control calculation according to a formula $\Delta_{PUCCH\_TF,c}(i) = 10 \log_{10}(2^{g(O_{UCI}/N_{RE})} - 1)$, wherein $g(O_{UCI}/N_{RE})$ is a function with $O_{UCI}$ and $N_{RE}$ being variables.

In a possible implementation, the processor determines the quantity $N_{RE}$ of REs bearing the UCI in the PUCCH by:

determining $N_{RE}$ as $\frac{2}{3} * N_{symb}^{PUCCH} * M_{SC}^{PUCCH}$ when a PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determining $N_{RE}$ as $(N_{symb}^{PUCCH}-N_{DMRS-symb}^{PUCCH})$ *$M_{SC}^{PUCCH}$ when a PUCCH format 3/4 is used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a DMRS defined in the PUCCH format 3/4, and $M_{SC}^{PUCCH}$ is a PUCCH bandwidth occupied by UCI defined in the PUCCH format 3/4.

In a possible implementation, $g(O_{UCI}/N_{RE})$ is a linear fitting function with $O_{UCI}$ and $N_{RE}$ being variables.

In a possible implementation, $g(O_{UCI}/N_{RE})$ is $a*(O_{UCI}/N_{RE})+b$, wherein a and b are tuning coefficients, $1.5 \leq a \leq 2.5$, and $-1 \leq b \leq 1$.

In a possible implementation, a and b include a plurality of preset values respectively, and the processor determines the offset $\Delta_{PUCCH\_TF,c}(i)$ for PUCCH power control calculation according to the formula $\Delta_{PUCCH\_TF,c}(i)=10 \log_{10}(2^{g(O_{UCI}/N_{RE})}-1)$ by:

determining values of a and b corresponding to a PUCCH format used for transmitting the first UCI, the $O_{UCI}$ of the first UCI, and a frequency hopping situation.

In a third aspect, a terminal is provided, which includes:

a first determining device configured to determine a quantity $O_{UCI}$ of bits of first UCI required to be transmitted on a PUCCH, and determine a quantity $N_{RE}$ of REs bearing the first UCI in the PUCCH;

a second determining device configured to determine an offset $\Delta_{PUCCH\_TF,c}(i)$ for PUCCH power control calculation according to a formula $\Delta_{PUCCH\_TF,c}(i)=10 \log_{10}(2^{g(O_{UCI}/N_{RE})}-1)$, wherein $g(O_{UCI}/N_{RE})$ is a function with $O_{UCI}$ and $N_{RE}$ being variables.

In a possible implementation, the first determining device is configured to: determine $N_{RE}$ as $\frac{2}{3}*N_{symb}^{PUCCH}*M_{SC}^{PUCCH}$ when a PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determine $N_{RE}$ as $(N_{symb}^{PUCCH}-N_{DMRS-symb}^{PUCCH})$ *$M_{SC}^{PUCCH}$ when a PUCCH format 3/4 is used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a DMRS defined in the PUCCH format 3/4, and $M_{SC}^{PUCCH}$ is a PUCCH bandwidth occupied by UCI defined in the PUCCH format 3/4.

In a possible implementation, $g(O_{UCI}/N_{RE})$ is a linear fitting function with $O_{UCI}$ and $N_{RE}$ being variables.

In a possible implementation, $g(O_{UCI}/N_{RE})$ is $a*(O_{UCI}/N_{RE})+b$, wherein a and b are tuning coefficients, $1.5 \leq a \leq 2.5$, and $-1 \leq b \leq 1$.

In a possible implementation, a and b include a plurality of preset values respectively, and the second determining device is configured to:

determine values of a and b corresponding to a PUCCH format used for transmitting the first UCI, the $O_{UCI}$ of the first UCI, and a frequency hopping situation.

In a fourth aspect, a computer readable storage medium is provided.

The computer readable storage medium stores computer instructions, which cause a computer device to perform the method as described in the first aspect when running on the computer device.

In the embodiments of the present application, for determining the PUCCH power control offset, the quantity $O_{UCI}$ of bits of the first UCI required to be transmitted on the PUCCH is determined, and the quantity $N_{RE}$ of REs bearing the first UCI in the PUCCH is determined; and the offset $\Delta_{PUCCH\_TF,c}(i)$ for PUCCH power control calculation is determined according to the formula $\Delta_{PUCCH\_TF,c}(i)=10 \log_{10}(2^{g(O_{UCI}/N_{RE})}-1)$, wherein $g(O_{UCI}/N_{RE})$ is a function with $O_{UCI}$ and $N_{RE}$ being variables. Based on this solution, a new way to determine the PUCCH power control offset is provided. The test result shows that this solution can obtain the more accurate PUCCH power control offset, ensuring the transmission performance of the PUCCH channel in the new wireless communication system.

BRIEF DESCRIPTION OF THE DRAWINGS

In order to illustrate the embodiments of the present application more clearly, the accompanying figures which need to be used in describing the embodiments will be introduced below briefly. The accompanying figures described below are some embodiments of the present application.

DETAILED DESCRIPTION OF THE EMBODIMENTS

The embodiments of the present application will be described clearly and completely below in combination with the accompanying drawings in the embodiments of the present application. The described embodiments are a part of the embodiments of the present application but not all the embodiments.

Furthermore, the term "and/or" herein is simply an association relationship describing the associated objects, indicating that there may be three relationships, for example, A and/or B may represent three conditions of: only A, both A and B, and only B. Furthermore, the character "/" herein generally indicates the "or" relationship of the front and back associated objects without special illustration. Furthermore, it should be understood that the word such as "first" or "second" in the description of the embodiments of the present application is only for purpose of distinguishing the description, and cannot be construed to indicate or imply the relative importance and cannot be construed to indicate or imply the order either.

Firstly, the application scenarios and related knowledge of the embodiments of the present application will be introduced.

In the LTE wireless communication system, the base station adjusts the power of the user terminal by way of open-loop and closed-loop power control, and the base station feeds back the power control information to the UE according to the UE uplink measurement result and adjusts the uplink transmit power obtained by the UE through the open-loop power control, and thus can control the transmit power of the UE more accurately.

The LTE uses $\Delta_{TF,c}(i)$ as a parameter in the calculation of the Physical Uplink Shared Channel (PUSCH) power, $\Delta_{TF,c}(i)$ represents the offset related to the transmission format, and the calculation formula thereof is $\Delta_{TF,c}(i)=10 \log_{10}((2^{BPRE \cdot K_s}-1) \cdot \beta_{offset}^{PUSCH})$, wherein $K_s$ is the value configured by the high layer. When $K_s=1.25$, the adjustment is initiated; when $K_s=0$, the adjustment is closed. For the UCI without any uplink data, $BPRE=O_{CQI}/N_{RE}$, wherein $O_{CQI}$ is the bit length of the Cyclic Redundancy Checksum (CRC) contained in the Channel Quality Indicator (CQI)/Pre-coding Matrix Indicator (PMI), $N_{RE}$ is the quantity of available Resource Elements (REs) of the PUSCH; for other cases, $$BPRE = \sum_{r=0}^{C-1} K_r / N_{RE};$$

and $\beta_{offset}^{PUSCH}$ is the corresponding resource offset parameter when the UCI is transmitted on the PUSCH, and defined as $\beta_{offset}^{PUSCH}=\beta_{offset}^{CQI}$ here.

There is no definite solution for the definition of $\Delta_{PUCCH\_TF,c}(i)$ in the NR.

Specifically, the PUCCH formats used in the LTE are different from the PUCCH formats in the NR. The NR supports 5 new PUCCH formats: the PUCCH format 0 is a short PUCCH format of 2 bits or less; the PUCCH format 1 is a long PUCCH format of 2 bits or less; the PUCCH format 2 is a short PUCCH format of 2 bits or more; the PUCCH format 3 is a short PUCCH format of 2 bits or more and does not support multi-user multiplexing; and the PUCCH format 4 is a short PUCCH format of 2 bits or more and supports multi-user multiplexing. The TBCC coding is used in the LTE, and the coding combination scheme of CA-Polar and PC CA-Polar is used in the NR. In terms of performance, the performance of the NR scheme is much better than that of the LTE. Since the PUCCH formats, bit range, coding scheme, etc. used in the NR are all different, the reuse of $\Delta_{PUCCH\_TF,c}(i)$ in the LTE may reduce the transmission performance of the PUCCH in the NR. The offset used in the power control calculation performed for the NR PUCCH format 2/3/4 also needs to be different from that of LTE, to adapt to the new power control method and coding scheme in the NR.

The idea of the embodiments of the present application is to consider the calculation method of Signal to Noise Ratio (SNR) in the information theory. For the PUCCH format 2 and PUCCH format 3/4 in the NR, by taking $O_{UCI}$ and $N_{RE}$ as the parameters, the corresponding formula form of $\Delta_{PUCCH\_TF,c}(i)$ and the value range applicable to the 5G Polar coding scheme are given.

First Embodiment

The embodiment of the present application provides a method for determining a PUCCH power control offset, where the method can be applied to a terminal, e.g., a mobile phone, a tablet computer, a personal computer, a notebook computer, a wearable electronic device, and other devices with communication functions.

Figure 1:
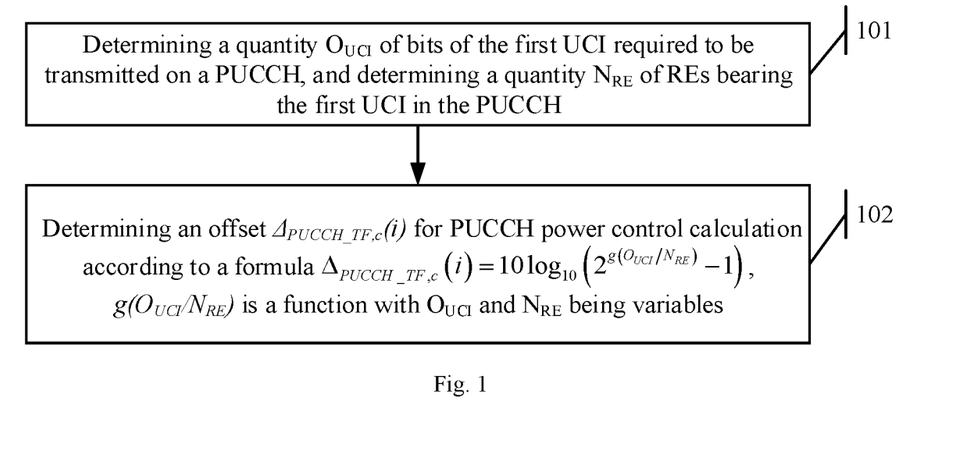
FIG. 1 is a schematic flowchart of a method for determining a PUCCH power control offset according to an embodiment of the present application.

Referring to FIG. 1, the process of the method for determining the PUCCH power control offset in the embodiment of the present application is described as follows.

Step 101: determining a quantity $O_{UCI}$ of bits of the first UCI required to be transmitted on a PUCCH, and determine a quantity $N_{RE}$ of REs bearing the first UCI in the PUCCH.

Step 102: determining an offset $\Delta_{PUCCH\_TF,c}(i)$ for the PUCCH power control calculation according to a formula $\Delta_{PUCCH\_TF,c}(i)=10 \log_{10}(2^{g(O_{UCI}/N_{RE})}-1)$, wherein $g(O_{UCI}/N_{RE})$ is a function with $O_{UCI}$ and $N_{RE}$ being variables.

Here, $O_{UCI}$ may mean the number of bits of the CRC contained in the UCI.

In a possible embodiment, the formula of calculating $\Delta_{PUCCH\_TF,c}(i)$ in some embodiments of the present application may be set to be used only in the case of $O_{UCI}>17$ bits.

In an embodiment of the present application, for different PUCCH formats, the quantity $N_{RE}$ of REs bearing the first UCI in the PUCCH is determined in different ways.

(1) For the PUCCH format 2, $N_{RE}=\frac{2}{3} \ast N_{symb}^{PUCCH} \ast M_{SC}^{PUCCH}$.

Here, $N_{symb}^{PUCCH}$ is a quantity of PUCCH symbols occupied by the UCI defined in the PUCCH format 2, and $M_{SC}^{PUCCH}$ is the PUCCH bandwidth occupied by the UCI defined in the PUCCH format 2.

(2) For the PUCCH format 3, $N_{RE}=(N_{symb}^{PUCCH}-N_{DMRS-symb}^{PUCCH}) \ast M_{SC}^{PUCCH}$.

Here, $N_{symb}^{PUCCH}$ is a quantity of PUCCH symbols occupied by the UCI defined in the PUCCH format 3, $N_{DMRS-symb}^{PUCCH}$ is a quantity of PUCCH symbols occupied by a DMRS defined in the PUCCH format 3, and $M_{SC}^{PUCCH}$ is the PUCCH bandwidth occupied by the UCI defined in the PUCCH format 3.

(3) For the PUCCH format 4, $N_{RE}=(N_{symb}^{PUCCH}-N_{DMRS-symb}^{PUCCH}) \ast M_{SC}^{PUCCH}$.

Here, $N_{symb}^{PUCCH}$ is a quantity of PUCCH symbols occupied by the UCI defined in the PUCCH format 4, $N_{DMRS-symb}^{PUCCH}$ is a quantity of PUCCH symbols occupied by a DMRS defined in the PUCCH format 4, and $M_{SC}^{PUCCH}$ is the PUCCH bandwidth occupied by the UCI defined in the PUCCH format 4.

In other words, the way to determine $N_{RE}$ when using the PUCCH format 2 to transmit the UCI is different from the way to determine $N_{RE}$ when using the PUCCH format 3/4 to transmit the UCI. That is, $\Delta_{PUCCH\_TF,c}(i)$ is calculated by using different parameters for the PUCCH format 2 and PUCCH format 3/4.

In a possible embodiment, $g(O_{UCI}/N_{RE})$ in the formula $\Delta_{PUCCH\_TF,c}(i)=10 \log_{10}(2^{g(O_{UCI}/N_{RE})}-1)$ is a linear fitting function with $O_{UCI}$ and $N_{RE}$ being variables.

For example, a possible expression of the linear fitting function $g(O_{UCI}/N_{RE})$ is: $a \ast (O_{UCI}/N_{RE})+b$, that is, $g(O_{UCI}/N_{RE})=a \ast (O_{UCI}/N_{RE})+b$ in this case.

Here, a and b are tuning coefficients which are preset values, where the value range of a may be [1.5, 2.5], and the value range of b may be [−1, 1], that is, $1.5 \leq a \leq 2.5$, $-1 \leq b \leq 1$.

Since the PUCCH format, the UCI length range and whether to use the frequency hopping may affect the transmission performance, the SNRs that meet the Block Error Rate (BLER) requirement are different. Thus, in the embodiments of the present application, different values of a and b may be used for different situations to reflect the impact of performance changes on the power control offset more accurately.

According to the combinations of three conditions: PUCCH format, UCI length range and whether to use the frequency hopping (i.e., frequency hopping situation), 8 cases may be obtained, and the corresponding values of a and b may be preset for any one of these 8 cases. A possible correspondence is shown in Table 1:

TABLE 1

| $O_{UCI}$ | PUCCH format | | | | | | | |
|---|---|---|---|---|---|---|---|---|
| | 2 | | | | 3/4 | | | |
| | $18 \leq O_{UCI} \leq 25$ | | $O_{UCI} > 25$ | | $18 \leq O_{UCI} \leq 25$ | | $O_{UCI} > 25$ | |
| whether to use frequency hopping | Yes | No | Yes | No | Yes | No | Yes | No |
| Value of a | a1 | a2 | a3 | a4 | a5 | a6 | a7 | a8 |
| Value of b | b1 | b2 | b3 | b4 | b5 | b6 | b7 | b8 | wherein 8 preset values a1-a8 may include the same value, and of course, these 8 preset values may also be all different while the value ranges of these 8 preset values are all in [1.5, 2.5]; and 8 preset values b1-b8 may include the same value, and of course, these 8 preset values may also be all different while the value ranges of these 8 preset values are all in [−1, 1].

That is to say, in some embodiments of the present application, the correspondence among the PUCCH format, the UCI length range, the frequency hopping situation and the values of a and b may be preset. When $\Delta_{PUCCH\_TF,c}(i)$ used for transmitting the first UCI is calculated, there is only a need to determine the values of a and b corresponding to the PUCCH format, $O_{UCI}$ of the first UCI and the frequency hopping situation required to be used for transmitting the first UCI from a plurality of preset values included respectively in a and b according to the preset correspondence.

In a possible embodiment, the formula $\Delta_{PUCCH\_TF,c}(i)=10 \log_{10}(2^{g(O_{UCI}/N_{RE})}-1)$ and the preset values of a and b in the formula may be determined through simulation tests.

For ease of understanding, the method for determining the PUCCH power control offset will be illustrated below by way of examples.

First Example

Assuming a=2.2902 and b=0.1479 are set for PUCCH format 2, $18 \leq O_{UCI} \leq 25$, and using frequency hopping, that is, a1=2.2902 and b1=0.1479 in Table 1 are set, then:

When the UE obtains $O_{UCI}$=18 and calculates $N_{RE}$=16 by using the parameters set by the upper layer, $\Delta_{PUCCH\_TF,c}(i)$=7.4887 may be calculated according to the formula $\Delta_{PUCCH\_TF,c}(i)=10 \log (2^{g(O_{UCI}/N_{RE})}-1)$, that is, the power control offset suitable for the Polar code is obtained.

Figure 3:
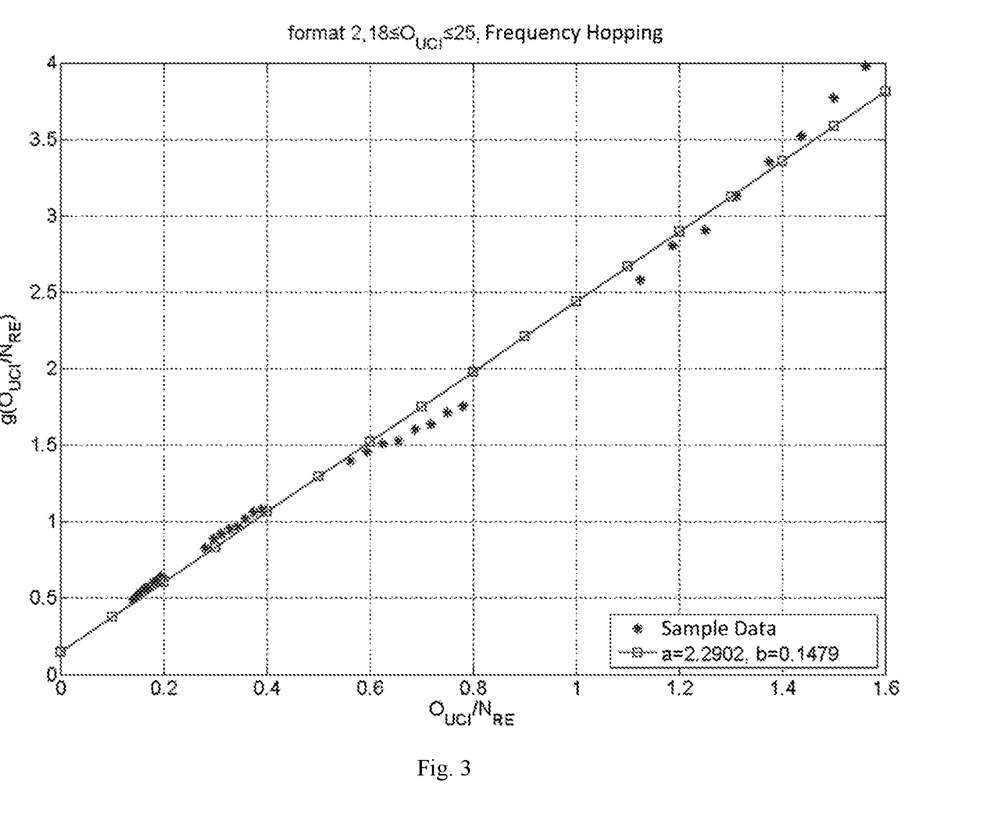
FIG. 3 is schematic diagram of a function $g(O_{UCI}/N_{RE})$ according to an embodiment of the present application.

Refer to FIG. 3, it can be seen that the values of the function $g(O_{UCI}/N_{RE})$ corresponding to different $O_{UCI}/N_{RE}$ under such parameters are all relatively close to the set sample data.

Second Example

Assuming a=2.1871 and b=0.4385 are set for PUCCH format 2, $18 \leq O_{UCI} \leq 25$, and no frequency hopping, that is, a2=2.1871 and b2=0.4385 in Table 1 are set, then:

When the UE obtains $O_{UCI}$=20 and calculates $N_{RE}$=16 by using the parameters set by the upper layer, $\Delta_{PUCCH\_TF,c}(i)$=9.1727 may be calculated according to the formula $\Delta_{PUCCH\_TF,c}(i)=10 \log (2^{g(O_{UCI}/N_{RE})}-1)$, that is, the power control offset suitable for the Polar code is obtained.

Figure 4:
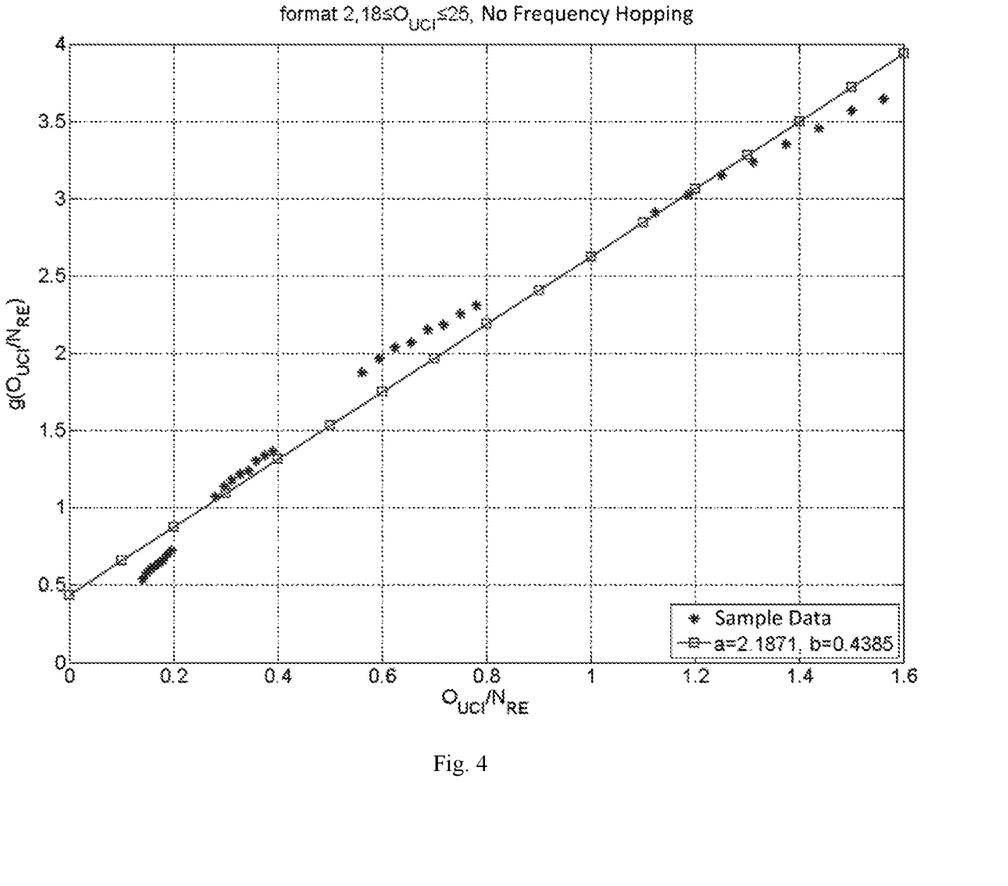
FIG. 4 is schematic diagram of a function $g(O_{UCI}/N_{RE})$ according to an embodiment of the present application.

Refer to FIG. 4, it can be seen that the values of the function $g(O_{UCI}/N_{RE})$ corresponding to different $O_{UCI}/N_{RE}$ under such parameters are all relatively close to the set sample data.

Third Example

Assuming a=1.8746 and b=0.5063 are set for PUCCH format 3, $O_{UCI} \geq 26$ (i.e., $O_{UCI} > 25$), and using frequency hopping, that is, a7=1.8746 and b7=0.5063 in Table 1 are set, then:

When the UE obtains $O_{UCI}$=32 and calculates $N_{RE}$=24 by using the parameters set by the upper layer, $\Delta_{PUCCH\_TF,c}(i)$=8.4791 may be calculated according to the formula $10 \log_{10}(2^{g(O_{UCI}/N_{RE})}-1)$, that is, the power control offset suitable for the Polar code is obtained.

Figure 5:
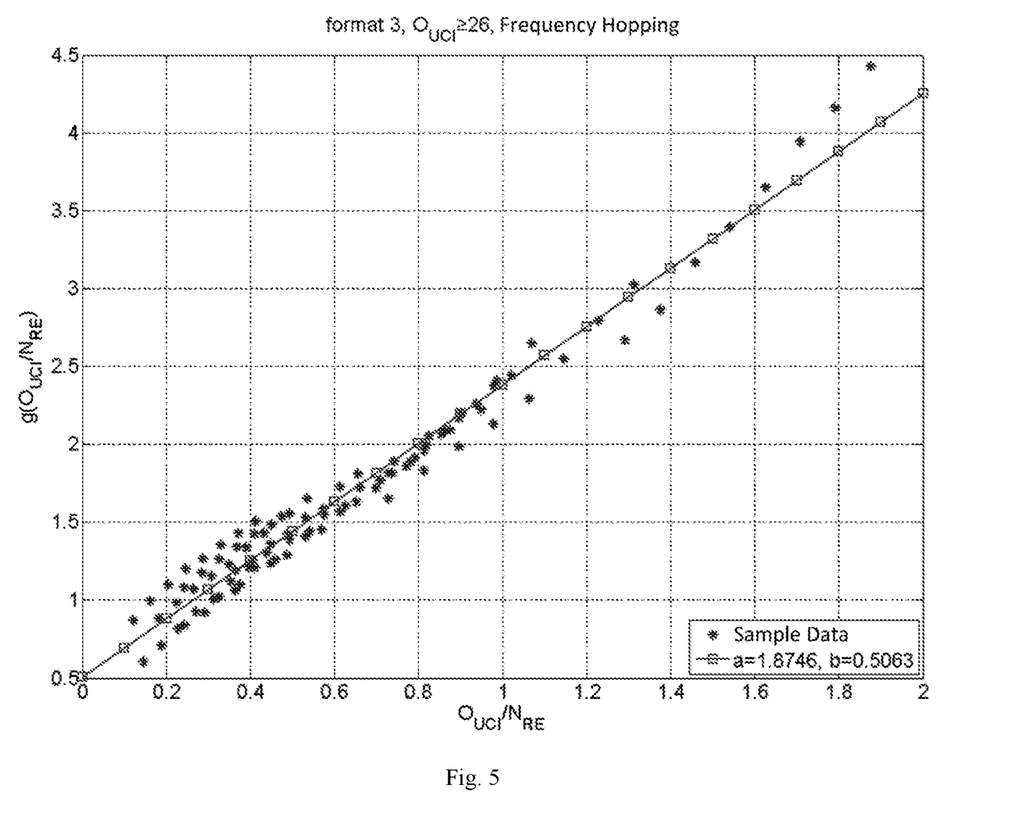
FIG. 5 is schematic diagram of a function $g(O_{UCI}/N_{RE})$ according to an embodiment of the present application.

Refer to FIG. 5, it can be seen that the values of the function $g(O_{UCI}/N_{RE})$ corresponding to different $O_{UCI}/N_{RE}$ under such parameters are all relatively close to the set sample data.

Second Embodiment

Figure 2:
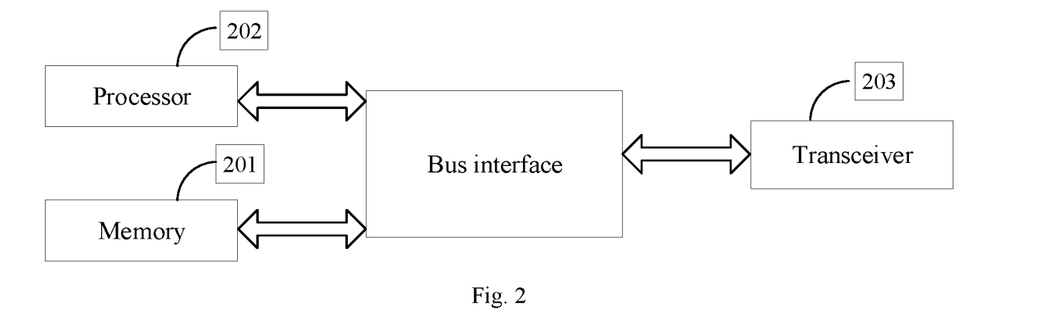
FIG. 2 is a schematic diagram of a terminal according to an embodiment of the present application.

Based on the same inventive concept, an embodiment of the present application provides a terminal, which includes at least a memory and a processor, and is, for example, the terminal shown in FIG. 2. The terminal shown in FIG. 2 includes a memory 201, a processor 202 and a transceiver 203, wherein the memory 201 and the transceiver 203 may be connected to the processor 202 through a bus interface, or may be connected to the processor 202 through special connection lines; and the transceiver 203 may be configured to receive the information sent by devices such as base stations, for example, receive the high-level signaling.

Here, the memory 201 may be configured to store instructions, and the processor 202 may be configured to read the instructions in the memory 201 and perform the process of:

determining a quantity $O_{UCI}$ of bits of the first UCI required to be transmitted on a PUCCH, and determining a quantity $N_{RE}$ of REs bearing the first UCI in the PUCCH; and determining an offset $\Delta_{PUCCH\_TF,c}(i)$ for PUCCH power control calculation according to a formula $\Delta_{PUCCH\_TF,c}(i)=10 \log_{10}(2^{g(O_{UCI}/N_{RE})}-1)$, wherein $g(O_{UCI}/N_{RE})$ is a function with $O_{UCI}$ and $N_{RE}$ being variables.

In a possible embodiment, the processor 202 determines the quantity $N_{RE}$ of REs bearing the UCI in the PUCCH by:

determining $N_{RE}$ as $2/3 * N_{symb}^{PUCCH} * M_{SC}^{PUCCH}$ when the PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determining $N_{RE}$ is $(N_{symb}^{PUCCH}-N_{DMRS-symb}^{PUCCH}) * M_{SC}^{PUCCH}$ when the PUCCH format 3/4 is RE used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a Demodulation Reference Signal, DMRS, defined in the PUCCH format 3/4, and $M_{SC}^{PUCCH}$ is a PUCCH bandwidth occupied by UCI defined in the PUCCH format 3/4.

In a possible embodiment, $g(O_{UCI}/N_{RE})$ is a linear fitting function with $O_{UCI}$ and $N_{RE}$ being variables.

In a possible embodiment, $g(O_{UCI}/N_{RE})$ is specifically $a*(O_{UCI}/N_{RE})+b$, wherein a and b are tuning coefficients, $1.5 \leq a \leq 2.5$, and $-1 \leq b \leq 1$.

In a possible embodiment, a and b include a plurality of preset values respectively, and the processor 202 determines the offset $\Delta_{PUCCH\_TF,c}(i)$ for the PUCCH power control calculation according to the formula $\Delta_{PUCCH\_TF,c}(i)=10 \log_{10}(2^{g(O_{UCI}/N_{RE})}-1)$ by:

determining values of a and b corresponding to the PUCCH format used for transmitting the first UCI, the $O_{UCI}$ of the first UCI, and the frequency hopping situation.

Third Embodiment

Based on the same inventive concept, an embodiment of the present application provides a terminal, which includes a first determining device and a second determining device. In a specific implementation process, the first determining device and the second determining device may be an integral whole, or independent devices that can exchange the data with each other; and the first determining device and the second determining device may also be divided into a plurality of sub-devices, where each sub-device is used to implement specific functions of the first determining device or the second determining device.

The first determining device is configured to determine a quantity $O_{UCI}$ of bits of the first UCI required to be transmitted on a PUCCH, and determine a quantity $N_{RE}$ of REs bearing the first UCI in the PUCCH;

The second determining device is configured to determine an offset $\Delta_{PUCCH\_TF,c}(i)$ for PUCCH power control calculation according to a formula $\Delta_{PUCCH\_TF,c}(i)=10 \log_{10}(2^{g(O_{UCI}/N_{RE})}-1)$, wherein $g(O_{UCI}/N_{RE})$ is a function with $O_{UCI}$ and $N_{RE}$ being variables.

In a possible implementation, the first determining device is configured to: determine $N_{RE}$ as $\frac{2}{3}*N_{symb}^{PUCCH}*M_{SC}^{PUCCH}$ when the PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determine $N_{RE}$ as $(N_{symb}^{PUCCH}-N_{DMRS-symb}^{PUCCH})*M_{SC}^{PUCCH}$ when the PUCCH format 3/4 is used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a DMRS defined in the PUCCH format 3/4, and $M_{SC}^{PUCCH}$ is a PUCCH bandwidth occupied by UCI defined in the PUCCH format 3/4.

In a possible implementation, $g(O_{UCI}/N_{RE})$ is a linear fitting function with $O_{UCI}$ and $N_{RE}$ being variables.

In a possible implementation, $g(O_{UCI}/N_{RE})$ is specifically $a*(O_{UCI}/N_{RE})+b$, wherein a and b are tuning coefficients, $1.5 \leq a \leq 2.5$, and $-1 \leq b \leq 1$.

In a possible implementation, a and b include a plurality of preset values respectively, and the second determining device is configured to:

determine values of a and b corresponding to the PUCCH format used for transmitting the first UCI, the Om of the first UCI, and the frequency hopping situation.

Fourth Embodiment

Based on the same inventive concept, an embodiment of the present application provides a computer readable storage medium storing the computer instructions, which cause a computer device to perform the method as described in the first embodiment when running on the computer device.

In a specific implementation process, the computer readable storage medium includes: Universal Serial Bus (USB) flash drive, mobile hard disk, Read-Only Memory (ROM), Random Access Memory (RAM), magnetic disk or compact disc or various storage media that can store the program codes.

In the embodiments of the present application, for calculating the PUCCH power control offset, the number $O_{UCI}$ of bits of the first UCI required to be transmitted on the PUCCH is determined, and the number $N_{RE}$ of REs bearing the first UCI in the PUCCH is determined; and the offset $\Delta_{PUCCH\_TF,c}(i)$ for the PUCCH power control calculation is determined according to the formula $\Delta_{PUCCH\_TF,c}(i)=10 \log_{10}(2^{g(O_{UCI}/N_{RE})}-1)$ wherein $g(O_{UCI}/N_{RE})$ is a function with $O_{UCI}$ and $N_{RE}$ being variables. Based on this solution, a new way to determine the PUCCH power control offset is provided. The test result shows that this solution can obtain the more accurate PUCCH power control offset, ensuring the transmission performance of the PUCCH channel in the new wireless communication system.

Further, different methods for determining $N_{RE}$ are used for the PUCCH format 2 and PUCCH format 3/4, which can be more targeted and determine $N_{RE}$ more accurately, and thus obtain the more accurate PUCCH power control offset based on the determined $N_{RE}$.

The device embodiments described above are merely illustrative, wherein the devices/devices described as separate components may or may not be physically separated, and the components displayed as devices/devices may or may not be physical devices/devices, that is, may be located in one place or may be distributed onto multiple network devices/devices. Some or all of the devices may be selected according to the actual needs to achieve the objects of the solutions of the embodiments.

The embodiments may be implemented by means of software plus the required general-purpose hardware platform, or of course, may be implemented by means of hardware. Based on such understanding, the above embodiments in itself or the part which contributes to the prior art can be embodied in the form of software product. The computer software product can be stored in the computer readable storage medium such as ROM/RAM, disk, compact disc or the like, and include a number of instructions used to enable a computer equipment (which can be personal computer, server, network equipment or the like) to perform the methods described in various embodiments or some parts of the embodiments.

Finally, it should be noted that the above embodiments are only used to illustrate but not limit the technical solutions of the present application; although the present application has been illustrated in details by reference to the above embodiments, it should be understood by those ordinary skilled in the art that they can still modify the technical solutions recorded in all the above embodiments or equivalently replace some technical features therein; and these modifications and replacements do not make the essence of the corresponding technical solutions depart from the spirit and scope of the technical solutions of all the embodiments of the present application.

What is claimed is:

1. A method for determining a Physical Uplink Control Channel, PUCCH, power control offset, comprising:

determining a quantity $O_{UCI}$ of bits of first Uplink Control Information, UCI, required to be transmitted on a PUCCH, and determining a quantity $N_{RE}$ of Resource Elements, REs, bearing the first UCI in the PUCCH; and determining the offset $\Delta_{PUCCH\_TF,c}(i)$ for PUCCH power control calculation according to a formula $\Delta_{PUCCH\_TF,c}(i)=10 \log_{10}(2^{g(O_{UCI}/N_{RE})}-1)$, wherein $g(O_{UCI}/N_{RE})$ is a linear fitting function with $O_{UCI}$ and $N_{RE}$ being variables, and $g(O_{UCI}/N_{RE})$ is $a*(O_{UCI}/N_{RE})+b$, wherein a and b are tuning coefficients, $1.5 \leq a \leq 2.5$, and $-1 \leq b \leq 1$.

2. The method of claim 1, wherein the determining the quantity $N_{RE}$ of REs bearing the UCI in the PUCCH, comprises:

determining $N_{RE}$ as $2/3 * N_{symb}^{PUCCH} * M_{SC}^{PUCCH}$ when a PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determining NRE as $(N_{symb}^{PUCCH} - N_{DMRS-symb}^{PUCCH}) * M_{SC}^{PUCCH}$ when a PUCCH format 3/4 is used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a Demodulation Reference Signal, DMRS, defined in the PUCCH format 3/4, and $M_{SC}^{PUCCH}$ is a PUCCH bandwidth occupied by UCI defined in the PUCCH format 3/4.

3. The method of claim 1, wherein a and b comprise a plurality of preset values respectively, and the determining the offset $\Delta_{PUCCH\_TF,c}(i)$ for PUCCH power control calculation according to the formula $\Delta_{PUCCH\_TF,c}(i)=10 \log_{10}(2^{g(O_{UCI}/N_{RE})}-1)$, comprises:

determining values of a and b corresponding to a PUCCH format used for transmitting the first UCI, the $O_{UCI}$ of the first UCI, and a frequency hopping situation.

4. A terminal, comprising:

a memory configured to store instructions;

a processor configured to read the instructions in the memory to:

determine a quantity $O_{UCI}$ of bits of first Uplink Control Information, UCI, required to be transmitted on a PUCCH, and determine a quantity $N_{RE}$ of Resource Elements, REs, bearing the first UCI in the PUCCH; and determine an offset $\Delta_{PUCCH\_TF,c}(i)$ for PUCCH power control calculation according to a formula $\Delta_{PUCCH\_TF,c}(i)=10 \log_{10}(2^{g(O_{UCI}/N_{RE})}-1)$, wherein $g(O_{UCI}/N_{RE})$ is a linear fitting function with $O_{UCI}$ and $N_{RE}$ being variables, and $g(O_{UCI}/N_{RE})$ is $a*(O_{UCI}/N_{RE})+b$, wherein a and b are tuning coefficients, $1.5 \leq a \leq 2.5$, and $-1 \leq b \leq 1$.

5. The terminal of claim 4, wherein the processor determines the quantity $N_{RE}$ of REs bearing the UCI in the PUCCH by:

determining $N_{RE}$ as $2/3 * N_{symb}^{PUCCH} * M_{SC}^{PUCCH}$ when a PUCCH format 2 is used to transmit the first UCI, wherein $N_{symb}^{PUCCH}$ is a quantity of PUCCH symbols occupied by UCI defined in the PUCCH format 2, and $M_{SC}^{PUCCH}$ is a PUCCH bandwidth occupied by UCI defined in the PUCCH format 2;

and/or, determining $N_{RE}$ as $(N_{symb}^{PUCCH} - N_{DMRS-symb}^{PUCCH}) * M_{SC}^{PUCCH}$ when a PUCCH format 3/4 is used to transmit the first UCI, wherein $N_{symb}^{PUCCH}$ is a quantity of PUCCH symbols occupied by UCI defined in the PUCCH format 3/4, $N_{DMRS-symb}^{PUCCH}$ is a quantity of PUCCH symbols occupied by a Demodulation Reference Signal, DMRS, defined in the PUCCH format 3/4, and $M_{SC}^{PUCCH}$ is a PUCCH bandwidth occupied by UCI defined in the PUCCH format 3/4.

6. The terminal of claim 4, wherein a and b comprise a plurality of preset values respectively, and the processor determines the offset $\Delta_{PUCCH\_TF,c}(i)$ for PUCCH power control calculation according to the formula $\Delta_{PUCCH\_TF,c}(i)=10 \log_{10}(2^{g(O_{UCI}/N_{RE})}-1)$ by:

determining values of a and b corresponding to a PUCCH format used for transmitting the first UCI, the $O_{UCI}$ of the first UCI, and a frequency hopping situation.

7. A computer readable storage medium storing computer instructions, wherein the computer instructions running on a computer device cause the computer device to perform the method of claim 1.

* * * * *